United States Patent [19]

Schroeder

[11] 4,100,466
[45] Jul. 11, 1978

[54] COLD START SYSTEM FOR MOTORS

[75] Inventor: George Francis Schroeder, Wayne, N.J.

[73] Assignee: The Singer Company, Little Falls, N.J.

[21] Appl. No.: 749,651

[22] Filed: Dec. 10, 1976

[51] Int. Cl.² .................................. G01F 1/82
[52] U.S. Cl. ........................... 318/102; 318/171
[58] Field of Search ................... 318/171, 102, 649

[56] References Cited

U.S. PATENT DOCUMENTS

| 3,268,785 | 8/1966 | Gerber et al. | 318/102 X |
| 3,855,510 | 12/1974 | Houck | 318/171 |
| 3,908,158 | 9/1975 | Studtmann | 318/171 X |
| 3,994,165 | 11/1976 | Pfunter et al. | 318/171 |
| 4,012,679 | 3/1977 | Matsuda et al. | 318/171 X |

Primary Examiner—B. Dobeck
Attorney, Agent, or Firm—Thomas W. Kennedy

[57] ABSTRACT

Motors, particularly gyro motors, are started by initially operating the motors at a frequency lower than their normal operating frequency so as to draw a larger current and develop greater starting torque with the maximum current and torque limited by a current limiting DC power supply. Where at least two motors are provided sequencing of the two motors is accomplished thereby permitting use of essentially the same power supply which is required for normal operation.

7 Claims, 5 Drawing Figures

COLD START SYSTEM FOR MOTORS

BACKGROUND OF THE INVENTION

This invention relates to motors in general and more particularly to an improved cold start system particularly useful with gyroscope motors.

In gyro stabilized platforms for inertial guidance, it is common practice to start motors at cold temperatures (0° C) in a very short time (2 seconds). Such is necessitated by the requirement for rapid reaction alignment in gyrocompassing within a few minutes in fighter type aircraft.

Another requirement placed on such apparatus is that the bearings in the motors must have long bearing life. This has dictated higher viscosities in the lubricating oil for the bearings which has in turn aggravated the problem of cold starting since oils of this nature get even more viscous at low temperatures.

The traditional solution in the prior art is to program the power supply during the start up cycle to supply a high voltage in order to bring the motors up to saturation and up to maximum torque. This means that the power supply must be designed for a maximum total power during the starting period which is much higher than the normal running power. Similarly, the switching module which converts the DC into AC to drive the motor must also be designed for higher voltage.

Thus, although the present solution works, it is obtained only through a higher cost in both the materials used and in increased weight of the apparatus. Thus, the need for an improved cold starting system which keeps the power supply and switching module requirements to a minimum, i.e. that required for normal running, but still provides fast starting at cold temperatures becomes evident.

SUMMARY OF THE INVENTION

The present invention provides such a gyro cold start system. The present invention does this by recognizing that gyro motors are normally of the hysteresis synchronous type. In a balanced multiphased hysteresis motor, the starting torque is essentially independent of frequency and dependent on the excitation current up to saturation. Under normal use, to conserve power and reduce heating in the gyro, the motor is run considerably away from saturation. As a result, the actual starting torque is considerably less than the maximum that is available from the iron of the motor. Since the frequency of excitation of the gyro must be very accurate it is conventional to establish the gyro wheel frequency by counting down from a crystal clock. Once the required frequency is achieved, it is used to control a switching module which converts the DC energy into AC to drive the motor of the gyro.

The present invention takes advantage of these existing facts to provide an improved cold start system which does not require higher than normal voltages thus permitting a smaller power supply and a switching module with lower rated voltages to be utilized. In accordance with the present invention a lower than normal frequency is obtained by increasing the countdown logic. For example, if the normal frequency was 480 Hz. it could be divided further to get a frequency of 240 Hz. Since the motor impedance is essentially inductive, it will draw approxiamtely twice the current for the same voltage. This essentially doubles the motor torque. Naturally, the increase in current and increase in torque will depend on the detailed design of the particular motor involved. For example, it will be dependent on how near to saturation the motor normally operates, the DC impedance of the motor, the specific limits of the DC power supply and so on.

In accordance with a further feature of the present invention sequencing is carried out so as to sequentially supply power to the various phases of more than one motor. This results in being able to supply maximum available power to the motor which is being started. For example, in a two motor system, the power supply must normally supply both motors. If during start up the power supply is sequenced so as to only supply one motor at a time it will have sufficient current capacity to supply that motor with twice its normal current in order to generate the necessary starting torque.

As will be more fully explained in the detailed description below, variation of frequency and/or sequencing can be carried out as necessary for any particular situation. Furthermore, the present invention can be used with other types of AC motors such as multiphase induction motors and salient pole synchronous motors. Also, the present invention is not limited only to gyro motors but can be used in any situation where quick starting at cold temperatures is necessary.

DETAILED DESCRIPTION OF THE INVENTION

The present invention presumes an inertial platform having at least two gyros. For the purposes of the discussion which follows, it will be presumed that two gyros, a vertical gyro and an azimuth gyro, are provided. Furthermore, it will be assumed that the normal operating frequency of the gyros is 480 Hz.

Figure 1:
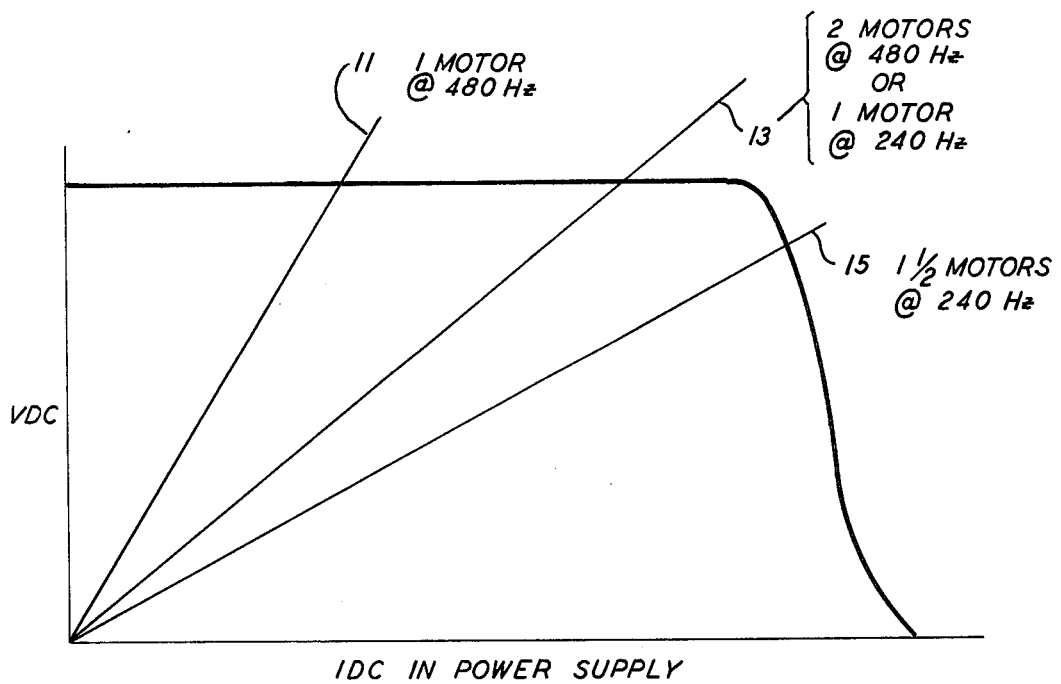
FIG. 1 is a graph illustrating the current voltage characteristics of a typical power supply used in conjunction with the present invention along with illustrating load lines for various types of motor operation.

FIG. 1 illustrated the voltage current relationship of the DC power supply, the supply being one with current limiting. Drawn on this figure are load lines for various conditions of peration. Shown are the load line 11 for one motor at 480 Hz., a load line 13 for two motors at 480 Hz and a load lien 15 indicating one and a half motors at 240 Hz. Assuming no saturation and a low DC winding resistance, the load line 13 also represents one motor at 240 Hz.

Figure 2:
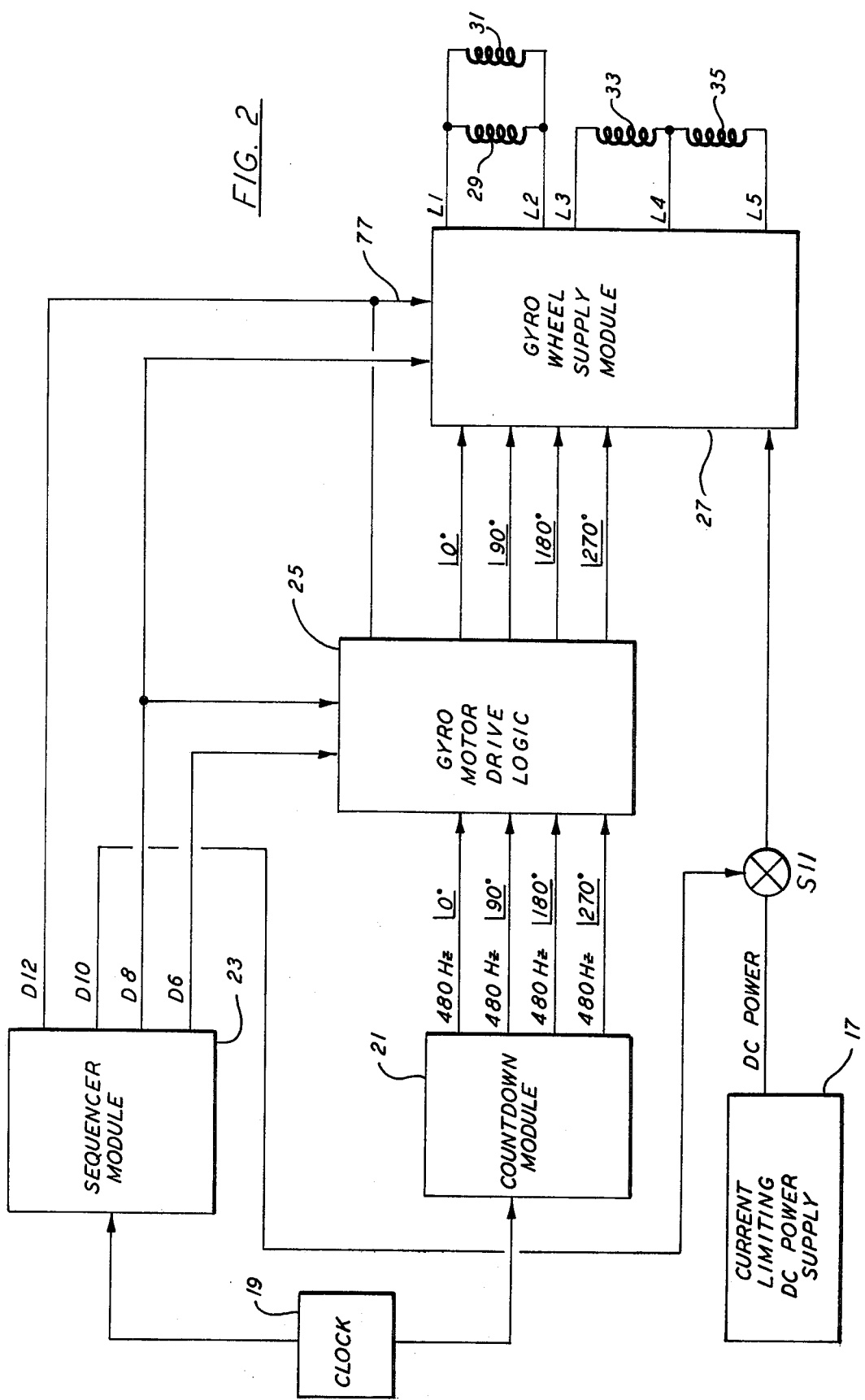
FIG. 2 is a block diagram of the system of the present invention.

FIG. 2 illustrated in block diagram form the system of the present invention. The system includes a current limiting DC power supply 17, a clock 19, countdown logic 21, sequencer module 23, the gyro motor drive logic 25, and a gyro wheel supply module 27. Coupled to the output of the gyro wheel supply module are two pairs of windings. Coupled to the terminals designated L1 and L2 in parallel are the first phase windings 29 and 31 associated respectively with a vertical gyro and an azimuth gyro. Also shown are windings 33 and 35 with the winding 33 coupled across terminals L3 and L4 and the winding 35 across terminals L4 and L5. Winding 33 is the second phase of the vertical gyro. Winding 35 is the second phase of the azimuth gyro. The purpose of the sequencer is to start one at a time. The sequencer is a simple timer which produces a series of discrete outputs in response to clock inputs. These are produced in the following order D-10, D-12, D-8 and D-6.

The sequencer 23 is a known device used in a prior art starting system. The discrete D-10 occurs as soon as power is supplied to the system. The sequencer 23 has an input (not shown) indicating a temperature of zero degrees has been reached. At temperatures below zero, heaters are used to warm up the system before starting. The signal D-12 occurs at a time X, X being the time when 0° F is reached. (This could be the same time as that at which D-10 occurs if the platform is about 0° F). The discrete D-8 occurs at a time of approximately X+2 sec and D-6 at X+4 sec.

The outputs are initially at 0 volts and rise to 5 volts and remain up as long as the system is active. The manner in which these outputs are used will be explained in more detail below in connection with the other modules.

Figure 3:
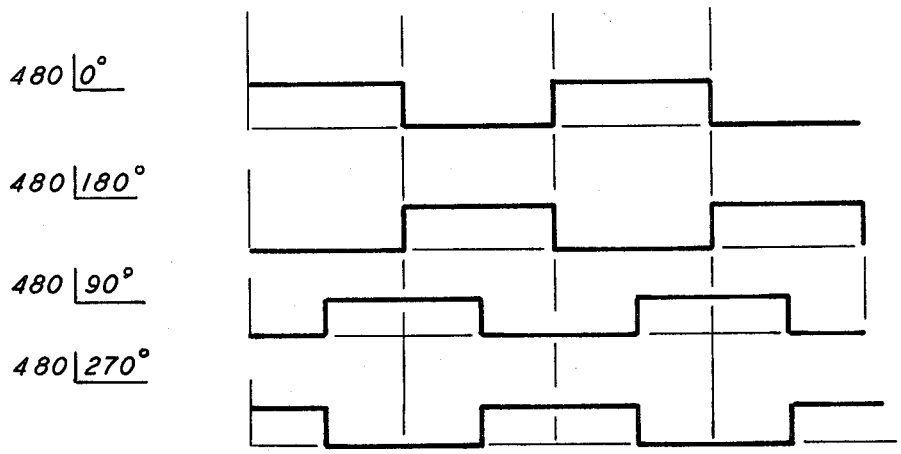
FIG. 3 is a waveform diagram illustrating the waveforms used to energize the motors of the present invention.

The countdown module is a standard counter producing a group four square waves designated 480 ∠0°, 480 ∠180°, 480 ∠90° and 480 ∠270°. The time relationship of these square waves is illustrated on FIG. 3. These outputs are provided to the gyro motor drive logic 25. The gyro motor drive logic provides corresponding outputs designated ∠0°, ∠90°, ∠180° and ∠270° to the gyro wheel supply module 27 which actually couples the DC power from the DC power supply to the various windings described above. The gyro wheel supply module switches the DC supply to the motor winding in such a manner as to apply an AC square wave to the windings of the motor. The timing illustrated on FIG. 3 is appropriate for the windings 29, 31, 33 and 35, since these are two phase windings. The gyro wheel supply module is basically a standard device as is the countdown module. In essence, the starting system of the present invention requires simply adding the gyro motor drive logic 25 between the countdown module 21, the sequence module 23 and the gyro wheel supply module 27.

Figure 4:
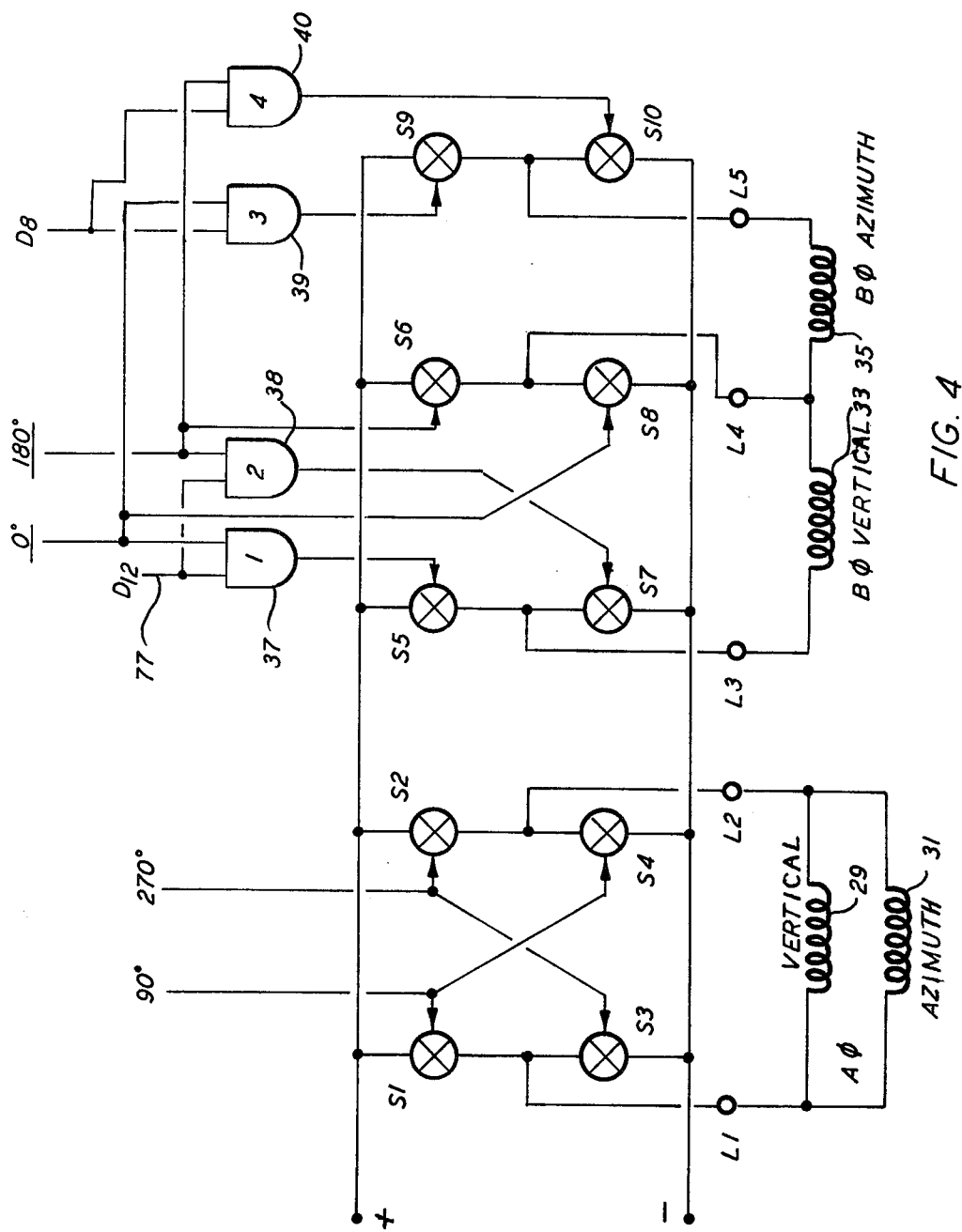
FIG. 4 is a schematic diagram of the gyro wheel supply module of FIG. 2.

The gyro wheel supply moduel is shown in more detail on FIG. 4. Shown feeding the terminals L1 and L2 across which are connected to the windings 29 and 31 is a bridge arrangement of switches S1 to S4. As illustrated, switches S1 and S2 have their one terminal coupled to the positive bus and switches S3 and S4 one terminal coupled to the negative or ground bus. The other respective terminals of switches S1 and S3 are connected together and to terminal L1. The other terminal of switches S2 and S4 are connected together and to terminal L2. The input ∠90° is the control input to switch S1 and switch S4 and the ∠270° the control input to switches S2 and S3. The switches are shown schematically but in actuality will of course be semi-conductor switches. It can be seen that the switches S1 and S2 will be turned on together and that the switches S2 and S3 will be turned on together. Referring to FIG. 3, it can be seen that such switching will result in an AC waveform being supplies across the windings 29 and 31. The windings 33 and 35 are supplied in similar fashion by means of the switches S5 to S10. Neglecting for a moment the gates 37 to 40, i.e., assuming these gates are enabled, the ∠180° signal controls the switches S7, S6 and S10 and the ∠0° signal controls the switches S5, S8 and S9. Thus, during the ∠0° portion of the cycle, switches S5 and S8 will be on supplying the coil 33. Switches S8 and S9 will be on supplying the coil 35. During the next half of the cycle, ∠180°, switches S6 and S7 will be on supplying the winding 33 and S6 and S10, supplying the winding 35. Once again, the windings will be supplied with a full AC square wave through this arrangement. As will be more fully explained below, during normal operation, the various 480 Hz signals will be coupled through the gyro motor drive logic and the gyro wheel supply module so as to operate the two motors at 480 Hz. By means of the AND gates 37 to 40, switch S5 and S7 respond only when the output D-12 is present. Switches S9 and S10 respond only when D-8 is present. An additional switch S11 as shown on FIG. 2 is interposed between the power supply and the supply module such that DC power is supplied to the supply module only when the signal D-10 is present.

Figure 5:
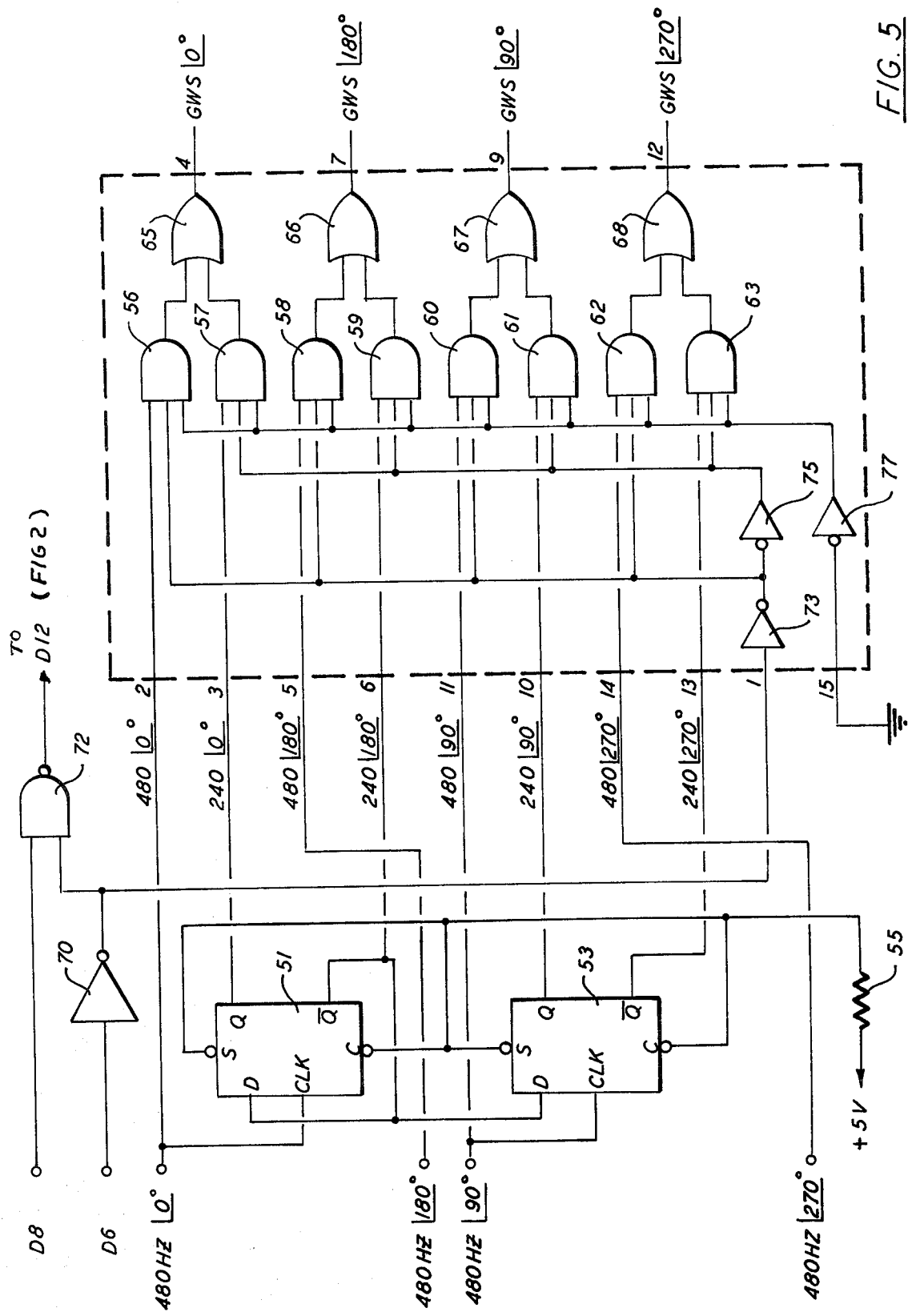
FIG. 5 is a logic diagram of the gyro motor drive logic of FIG. 2.

FIG. 5 illustrates in more detail the gyro motor drive logic. In response to the outputs from the sequencer module 23 the gyro motor drive logic supplies appropriate pulses to the gyro wheel supply module either at the normal frequency of 480 Hz during normal operation or, during start up at 240 Hz. The logic used in the circuits herein is diode transistor logic (DTL), unless otherwise noted. As illustrated the four 480 Hz signals at 0°, 180°, 90° and 270° are provided as inputs to the system. At the input of the system are two D type flip-flops 51 and 53. Each of these has a set input, a clear input, a D or data input, and a clock input. The 480 Hz ∠0° signal is coupled to the clock input of flipflop 51. This flipflop has its Q output tied back as its D input. Its Q output is also provided as the D input of this flipflop 53. The clock input of the flipflop 53 is coupled to the 480 Hz ∠90° signal. The clear and set inputs of both flipflops are all tied together and through a resistor 55 to a positive supply voltage. With this arrangement, the 480 Hz signal is divided down to develop, out of the Q output of flipflop 51, the signal 240 ∠0°; out of its Q output, the signal 240 ∠180°; out of the Q output of flipflop 53, the 240 ∠90° signal; and out of its Q output, the 240 ∠270° output. The 480 Hz and 240 Hz signal are provided as inputs to AND gates 56 to 63. The 480 ∠0° is one input to AND gate 56. The 240 angle 110 0° one input to AND gate 57. Similarly, AND gates 58 and 59 have the 480 Hz and 240 Hz ∠180° signals, the AND gates 60 and 61 the ∠90° signals and the AND gates 62 and 63 the ∠270° signals. The gates 56 and 57 provide their outputs as an input to OR gate 65. The outputs of AND gates 58 and 59 are inputs to an OR gate 66, the outputs of AND gates 60 and 61, the inputs to OR gate 67, the outputs of AND gates 62 and 63 of the inputs of OR gate 68. The outputs from these OR gates are the signals which are supplied to the gyro wheel supply module 27 of FIG. 2.

Also shown at the top of the FIG. 5 is additional logic controlled by the sequencer module 23. As illustrated, the signal D-6 is the input to an inverter 70. The output of this inverter along with the signal D-8 are inputs to an inverting AND gate 72 the output of which is wired to the signal D-12 from the sequencer module 23. Because DTL logic is used, if either the output of gate 72 or the signal D-12 is zero, the common lien will be at zero. The output of the inverter 70 is provided to an additional inverter 73, the output of which provides an enabling input to the gates 56, 58, 60 and 62. Following inverter 73 is an additional inverter 75, the output of which enables gates 57, 59, 61 and 63. The gates have a third input which is always enabled by the output of an inverter 77 having its input connected to ground.

In operation, the sequencer module which, as noted above, is a simple timer and can be made up of counters with appropriately decoded outputs to give the desired time sequence, first provides the output D-10. This output closes the switch S-11 to supply power to the gyro wheel supply module. At this point, the output D-12, D-8 and D-6 will still be "0". S-nce D-6 is a "0", the inverting amplifier 70 has as its output a "1". This "1" is inverted to a "0" in the inverter 73 and back to a "1" through the inverter 75. As a result, the gates 57, 59, 61 and 63 are enabled to pass the 240 Hz signals. Thus, initially the 240 Hz signal is supplied to the switches S1 and S4 and S8 and S6 of FIG. 4. With the switch S-11 closed and the 240 Hz squarewaves being supplied to the switches, switches S1 to S4 will operate and energize the windings 29 and 31 with 240 Hz AC squarewaves. At this time, D-12 is still "0" as in D-8. Thus, although the switches S-6 and S-8 can operate the remaining switches S5, S7, S9 and S10 are not enabled and there will not be a complete circuit through the windings 33 and 35 and these windings will not be energized. A short period after the windings 29 and 31 are energized, the sequencer module outputs D-12. With D-12 present, i.e., "1", AND gates 37 and 38 are enabled and switches S5 and S7 are all now operable. Now the winding 33 is energized. In other words, the vertical gyro is fully energized and can begin to come up to speed.

At this point D-8 is still "0". As a result, the output of AND gate 72 having a "1" and a "0" at its input will be a "1". This output is tied to D-12. Because the logic used is DTL logic, the common point will remain at a "1" only if all inputs thereto are "1"s. Thus, with D-12, a "1" and the output of gate 72 a "1", the line 77 at the input to the gyro wheel supply module shown on FIG. 2 and also FIG. 4 remains at a "1" keeping the gates 37 and 38 enabled. The first gyro motor is now being started at reduced frequency and the total current will be limited by the 240 Hz load line and the current limiting action of the DC power supply. The sequencer module now provides the output D-8, i.e., D-8 becomes "1". D-8 is an input to the inverting AND gate 72 shown on FIG. 1. Since D-6 is still at a "0" and the output of the inverter 70 a "1" there will now be two "1" at the input of gate 72 and its output will become "0". As a result, the AND gates 37 and 38 of FIG. 4 are disabled. Because of the "1" on D-8, the AND gates 39 and 40 are enabled. This enables switches S-9 and S-10 to operate along with the switches S-6 and S-8 to supply an AC squarewave to the winding 35. Under these conditions, the vertical gyro motor goes into a single phase operation at 240 Hz. The azimuth motor starts up now having both windings energized. As with the vertical motor, it comes up to the starting speed of 240 Hz.

After an appropriate time period for the azimuth motor to come up to speed, the sequencer module provides D-6 as a "1" output. This will result in the output of inverter 70 becoming a "0" and the output of the gate 72 returning to "1". In addition, the output of the inverter 73 will now become a "1" and the output of inverter 75 a "0". As a result, two things happen. The gates 37 and 38 are again enabled so that the winding 33 can be supplied. Furthermore, the gates 57, 59, 61 and 63 are now disabled and the gates 56, 58, 60 and 62 enabled to pass the 480 Hz signals to the gyro wheel supply module 27. Now all switches on FIG. 4 are operational and being supplied with 480 Hz and both motors will now come up to the 480 Hz speed. This is the final step in starting.

The discussion above related to the starting of a synchronous motor. The present invention can also be used in conjunction with other types of motors. For example, an induction motor typically having a squirrel cage rotor may a starting torque which is very low. Such a motor has a speed torque curve which is primarily a function of the rotor impedance and the slip frequency in the rotor. As the rotor approaches syncrhonous speed, the frequency in the rotor approaches zero. At stall the motor frequency is the line frequency. By utilizing the apparatus of the present invention, in particular the supply gyro wheel supply switching of FIG. 4 at a low frequency such as the slip frequency where maximum torque occurs, it is possible to start such a motor with maximum torque. Such an implementation as this would simply require energizing the windings with such a frequency determined from the speed torque characteristic of the motor instead of simply dividing the normal operating frequency in half. As with the embodiment just described, by limiting the DC current of the power supply the total power and the amount of torque will be controlled. As the motor speeds up rotor frequency will reduce and the torque will shift. Once the torque shifts and the motor is coming up to speed the frequency can be changed so as to bring the torque back to its maximum. Such operation can be continued in steps until the motor reaches maximum speed. Thus, the timer sequencer 23 could be programmed to provide a series of frequenceis to bring such a motor up to speed based on an analysis to determine the optimum switching points. It is also possible to use feedback control with the DC current and switching module or a speed sensor used to initiate switching.

A salient pole synchronous motor is also hard to start. It has no starting torque and is normally started by building an induction motor winding integral with the pole structure. As the compound induction rotor approaches synchronous speed, the salient pole of the rotor locks into synchronism. Since there is no slip, the induction winding then becomes inactive. In such a motor, if a very low frequency near DC were applied to the winding of a simple salient pole synchronous motor using the arrangement shown on the figures, the rotor would align itself with the stator field. By slowly increasing the frequency as limited by the rotor ability to develop enough torque to accelerate the inertial load and friction and still stay in synchronism, the motor could be slowly started and accelerated up to the required synchronous speed. A motor of this nature could then be used in an application such as for a gyro. Such a motor in some cases might be more efficient once started when compared to a hysteresis motor.

Thus, in its broadest aspects, the present invention provides means to supply variable frequency to an AC motor to change its starting characteristics to thereby permit bringing the motor up to speed without the need for voltages or currents over those normally used. Furthermore, the present invention contemplates using power supply current limiting characteristics so as to regulate the starting current in that motor.

What is claimed is:

1. A method for rapidly cold starting gyro motors in a gyro platform having at least a vertical gyro motor and an azimuth gyro motor both of which are multiphase motors normally operating at a first frequency said motors being supplied from a supply module comprising a plurality of switches for converting a DC voltage into a square wave AC voltage, said switches being supplied with appropriate switching waveforms at the normal operating frequency of the motors, comprising:

(a) dividing the normal frequency waveforms used to control the switching means to a lower frequency;
(b) energizing a first phase winding of both of said motors with said lower frequency;
(c) energizing the other phase windings of one of said motors with said lower frequency for a first predetermined amount of time;
(d) de-energizing said other windings of said first motor and energizing the other winding of said second motor, at said lower frequency;
(e) after a second predetermined period of time, energizing all windings of both motors with normal frequency.

2. The method according to claim 1 and further including the step of controlling the maximum starting current and torque by utilizing a current limiting DC power supply as the power supply.

3. In a gyro motor drive system which comprises:
(a) a crystal controlled clock;
(b) means for dividing the clock frequency into four first signals each at a first, normal frequency, each signal having a period equal to half the total period at said frequency and the first signals being respectively displaced 90° with respect to each other;
(c) a DC power supply; and
(d) a gyro wheel supply module obtaining positive and negative voltage inputs from the DC power supply and converting said DC voltage inputs into a square wave AC output utilizing said first signals, the improvement comprising:
(e) means for obtaining from said first signals at said first frequency four second signals bearing the same phase relationship at a second, lower frequency;
(f) logic means having as inputs said first and second signals adapted to respond to a control input to selectively provide one of said sets of four signals at its output, said output being coupled to said gyro wheels supply module; and
(g) sequencing means to provide said control input to cause said logic means to first output said signals at said second frequency for predetermined period of time and to then output said waveforms at said first frequency.

4. Apparatus according to claim 3 wherein two motors are in said drive system each having two phase windings and further including means in said gyro wheel supply module for selectively disabling the outputs to at least one of the windings of each of said two motors and wherein said sequencing means further includes means for providing outputs to sequentially enable both windings of only one of said motors to be energized for a period of time, then disable one of said windings of said one motor from being energized and enable both windings of the other motor to be energized, and, after a further period of time, enable both windings to be energized, all at said second frequency prior to energization at said first frequency.

5. Apparatus according to claim 4 wherein said logic means comprise a plurality of pairs of AND gates the first gate of each pair having as an input one of said first signal at said first frequency and the second having as an input the corresponding second signal at said second frequency;

a plurality of OR gates each having as inputs the outputs of a set of AND gates and providing at their outputs the switching waveforms to be provided to said gyro wheel supply module;
at least one inverter, said first AND gates of each set being coupled to be enabled by said control input, said control signal also coupled to said inverter, the output of said inverter coupled as an enabling input to all of the second gates of said sets.

6. Apparatus according to claim 5 wherein said sequencer module includes means to provide successive control outputs, a first control output being coupled to connect said power supply to said gyro wheel supply module, a second output occurring thereafter being coupled to said means in said gyro wheel supply module to enable said one motor to be energized, a third output coupled to said gyro wheel supply module to enable said second motor to be energized; and a fourth control output which is the control signal coupled to said gates and said inverter.

7. Apparatus according to claim 6 and further including an inverter having as an input said fourth control output; and an inverting AND gate having as inputs the output of said inverter and said third control signal, the output of said AND gate being connected to said fourth control output whereby the appearance of said third control output will disable said second control output and the appearance of said fourth control output will re-enable said second control output.

* * * * *